(12) United States Patent
Etoh et al.

(10) Patent No.: US 9,076,462 B2
(45) Date of Patent: Jul. 7, 2015

(54) MAGNETIC HEAD HAVING A SHORT YOKE WITH A TAPERED COIL STRUCTURE

(71) Applicant: HGST Netherlands B.V., Amsterdam (NL)

(72) Inventors: Kimitoshi Etoh, Odawara (JP); Kazuhiko Hosomi, Fujisawa (JP); Mikito Sugiyama, Odawara (JP); Yohji Maruyama, Iruma (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/095,952

(22) Filed: Dec. 3, 2013

(65) Prior Publication Data

US 2015/0154987 A1 Jun. 4, 2015

(51) Int. Cl.
*G11B 5/127* (2006.01)
(52) U.S. Cl.
CPC ...................... *G11B 5/127* (2013.01)
(58) Field of Classification Search
CPC ........... G11B 5/17; G11B 5/127; G11B 5/147
USPC ............. 360/123.06, 123.19, 123.02, 123.03, 360/123.05, 123.09
See application file for complete search history.

(56) References Cited

U.S. PATENT DOCUMENTS

| | | | |
|---|---|---|---|
| 5,134,288 A * | 7/1992 | Van Dijck | 250/307 |
| 5,472,736 A | 12/1995 | Barr et al. | |
| 5,777,973 A * | 7/1998 | Yoo et al. | 369/112.06 |
| 6,034,848 A | 3/2000 | Garfunkel et al. | |
| 6,483,662 B1 | 11/2002 | Thomas et al. | |
| 6,570,739 B2 | 5/2003 | Hsiao et al. | |
| 6,687,083 B2 | 2/2004 | Hsiao et al. | |
| 6,765,756 B1 | 7/2004 | Hong et al. | |
| 7,168,156 B2 | 1/2007 | Sasaki et al. | |
| 7,518,825 B2 | 4/2009 | Nishida et al. | |
| 7,612,963 B2 | 11/2009 | Allen et al. | |
| 7,835,111 B2 | 11/2010 | Flint et al. | |
| 8,218,263 B2 | 7/2012 | Allen et al. | |
| 8,797,684 B1 * | 8/2014 | Tran et al. | 360/123.06 |

(Continued)

FOREIGN PATENT DOCUMENTS

| | | |
|---|---|---|
| EP | 0650628 | 5/1995 |
| JP | 2011014207 | 1/2011 |
| WO | 9402938 | 2/1994 |

OTHER PUBLICATIONS

Arai, Y., "Stacked Coil for Hard Disk Recording Head," Disclosure No. IPCOM000122510D, IP.com, Dec. 1, 1991, 1 page.

(Continued)

*Primary Examiner* — Allen T Cao
(74) *Attorney, Agent, or Firm* — Zilka-Kotab, PC (57) ABSTRACT

In one embodiment, a magnetic head includes a main pole configured to write data to a magnetic medium using a magnetic field, a return pole positioned above the main pole at a media-facing surface of the magnetic head, the return pole being configured to return magnetic flux from the main pole after it has exited a magnetic medium, and a coil configured to produce magnetic flux in the main pole, the coil being positioned below the return pole, wherein a film thickness of a first turn of the coil on a media-facing surface side thereof is less than a film thickness of a second turn of the coil. Other magnetic heads having a shortened magnetic circuit length and methods of production thereof are presented in additional embodiments.

19 Claims, 12 Drawing Sheets

(56) References Cited

U.S. PATENT DOCUMENTS

| | | | |
|---|---|---|---|
| 2001/0028625 A1* | 10/2001 | Asada et al. | 369/112.24 |
| 2002/0060879 A1 | 5/2002 | Sato | |
| 2002/0071377 A1* | 6/2002 | Ogata | 369/112.24 |
| 2003/0011943 A1* | 1/2003 | Webb et al. | 360/324.1 |
| 2003/0137780 A1* | 7/2003 | Fontana et al. | 360/324.2 |
| 2003/0137781 A1* | 7/2003 | Carey et al. | 360/324.2 |
| 2004/0184189 A1* | 9/2004 | Mochizuki et al. | 360/125 |
| 2004/0240121 A1* | 12/2004 | Etoh et al. | 360/317 |
| 2005/0083608 A1* | 4/2005 | Watanabe | 360/126 |
| 2006/0034013 A1* | 2/2006 | Kato et al. | 360/128 |
| 2006/0044677 A1* | 3/2006 | Li et al. | 360/122 |
| 2006/0285248 A1* | 12/2006 | Pust et al. | 360/128 |
| 2007/0035881 A1* | 2/2007 | Burbank et al. | 360/234.3 |
| 2009/0251828 A1* | 10/2009 | Schreck et al. | 360/319 |
| 2009/0316302 A1* | 12/2009 | Aoki | 360/234.3 |
| 2010/0020324 A1* | 1/2010 | Uchida | 356/369 |
| 2010/0157477 A1* | 6/2010 | Morinaga et al. | 360/125.12 |
| 2010/0226044 A1* | 9/2010 | Iwase | 360/234.3 |
| 2010/0265618 A1* | 10/2010 | Boutaghou et al. | 360/234.3 |
| 2012/0127602 A1* | 5/2012 | Li et al. | 360/75 |
| 2012/0300334 A1* | 11/2012 | Hsiao et al. | 360/59 |

OTHER PUBLICATIONS

Batra, S. et al., "A Perpendicular Write Head Design for High-Density Recording," IEEE Transactions on Magnetics, vol. 38, No. 1, Jan. 2002, pp. 157-162.

Tagawa, I. et al., "High Performance Write Head for 10 krpm HDD with High Data Rate Recording up to 45 MB/s," IEEE Transactions on Magnetics, vol. 36, No. 1, Jan. 2000, pp. 177-182.

* cited by examiner

MAGNETIC HEAD HAVING A SHORT YOKE WITH A TAPERED COIL STRUCTURE

FIELD OF THE INVENTION

The present invention relates to magnetic data recording and storage, and more particularly, this invention relates to a magnetic head having a short yoke with a tapered coil structure.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, it is useful to increase the quality of the magnetization transition which determines the signal-to-noise ratio (SNR) of the bit information stored to the magnetic medium. In order to achieve this with conventional techniques, a write bubble that is faster than the transition speed of the recording medium is generated. Therefore, many attempts have been made to shorten a magnetic circuit length for a magnetic head in order to further improve the high frequency properties.

A specific structure of a magnetic circuit of a magnetic head is shown in Japanese Unexamined Patent Application Publication No. 2011-14207, specifically in FIG. 4, for example. In this example, a non-magnetic body is disposed between a trailing shield and a main pole at a media-facing surface. The trailing shield is connected to an upper return pole (URP). The URP is positioned above an insulator that insulates the coil which wraps around and is connected to an auxiliary pole at a rear portion thereof. The auxiliary pole is laminated in close contact with the main pole. In perpendicular magnetic recording, the magnetic flux produced at the media-facing surface returns to the URP via the soft magnetic backing layer of the medium, and forms a magnetic loop by returning to the main pole via the auxiliary pole.

SUMMARY

In one embodiment, a magnetic head includes a main pole configured to write data to a magnetic medium using a magnetic field, a return pole positioned above the main pole at a media-facing surface of the magnetic head, the return pole being configured to return magnetic flux from the main pole after it has exited a magnetic medium, and a coil configured to produce magnetic flux in the main pole, the coil being positioned below the return pole, wherein a film thickness of a first turn of the coil on a media-facing surface side thereof is less than a film thickness of a second turn of the coil.

In another embodiment, a method for forming a magnetic head includes forming a main pole configured to write data to a magnetic medium using a magnetic field, forming a coil including a plurality of turns above the main pole, the coil being configured to produce magnetic flux in the main pole, removing a portion of a first turn of the coil on a media-facing surface side thereof so that a film thickness of the first turn of the coil on the media-facing surface side thereof is less than a film thickness of a second turn of the coil, and forming a return pole above the main pole at a media-facing surface of the magnetic head, the return pole being configured to return magnetic flux from the main pole after it has exited a magnetic medium.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a main pole configured to write data to a magnetic medium using a magnetic field, a return pole positioned above the main pole at a media-facing surface of the magnetic head, the return pole being configured to return magnetic flux from the main pole after it has exited a magnetic medium, and a coil configured to produce magnetic flux in the main pole, the coil being positioned below the return pole, wherein a film thickness of a first turn of the coil on a media-facing surface side thereof is less than a film thickness of a second turn of the coil.

In another general embodiment, a method for forming a magnetic head includes forming a main pole configured to write data to a magnetic medium using a magnetic field, forming a coil including a plurality of turns above the main pole, the coil being configured to produce magnetic flux in the main pole, removing a portion of a first turn of the coil on a media-facing surface side thereof so that a film thickness of the first turn of the coil on the media-facing surface side thereof is less than a film thickness of a second turn of the coil, and forming a return pole above the main pole at a media-facing surface of the magnetic head, the return pole being configured to return magnetic flux from the main pole after it has exited a magnetic medium.

Figure 1:
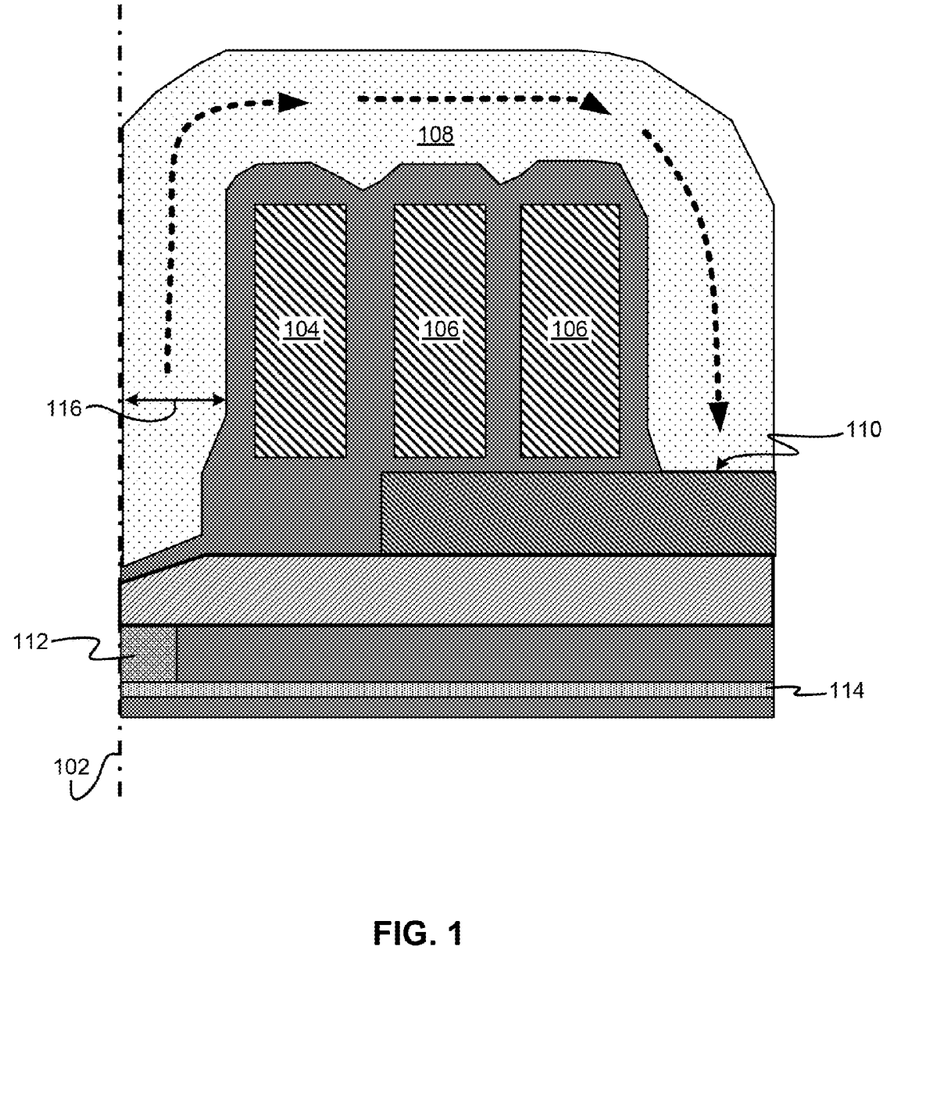
FIG. 1 is a diagram of a prototype short yoke magnetic head showing reduced intervals for a coil created during development of the present technology.

In order to shorten the length of a magnetic circuit, one of the simplest methods, as shown in the prototype magnetic head of FIG. 1, is to shorten the interval or spacing between the turns of the coil 106, to shorten the distance between the coil at the first turn 104 and the trailing shield 112 at the floating surface 102, to shorten the distance between the end of the coil 106 and the upper return pole (URP) 108, and to move the connection position 110 of the URP 108 at the end of the main pole 114 (the back contact) closer to the coil 106. However, if the interval is simply shortened, the following corresponding issues arise.

In this structure, the URP 108 that rises up and curves above the first turn 104 of the coil 106 from the media-facing surface 102 stands vertical with respect to a deposition thickness direction and is longer. Also, as shown in FIG. 1, by shortening the distance 116 between the media-facing surface-side of the URP 108 and the first turn of the coil 104, it is not possible to ensure sufficient film thickness and the risk of far track interference (FTI) increases.

In order to avoid these problems, a film thickness of the entire coil 106 may be reduced with narrower coil intervals. However, if the coil film thickness is uniformly reduced, the coil resistance is increased, and during operation a quantity of heat generated by the coil increases. Increasing the quantity of heat causes portions of the magnetic head to project towards the magnetic medium from the media-facing surface 102 due to thermal expansion, and as a result it is not possible to maintain the head floating distance and the risk of head damage increases.

In order to overcome deficiencies of prior attempted short yoke magnetic head designs, a magnetic head, according to one embodiment, comprises a main pole and an upper return pole which form a magnetic circuit and avoids the problems associated with short yoke magnetic head designs. In this magnetic head, a thickness of the coil film, which is conventionally uniform throughout a length of the coil, is produced to be thinner at one or more portions thereof without causing the problems associated with prior magnetic head designs. In one approach, a volume of the upper return pole may be reduced near to or at a media-facing surface of the magnetic head in order to shorten the magnetic circuit length.

Figure 2:
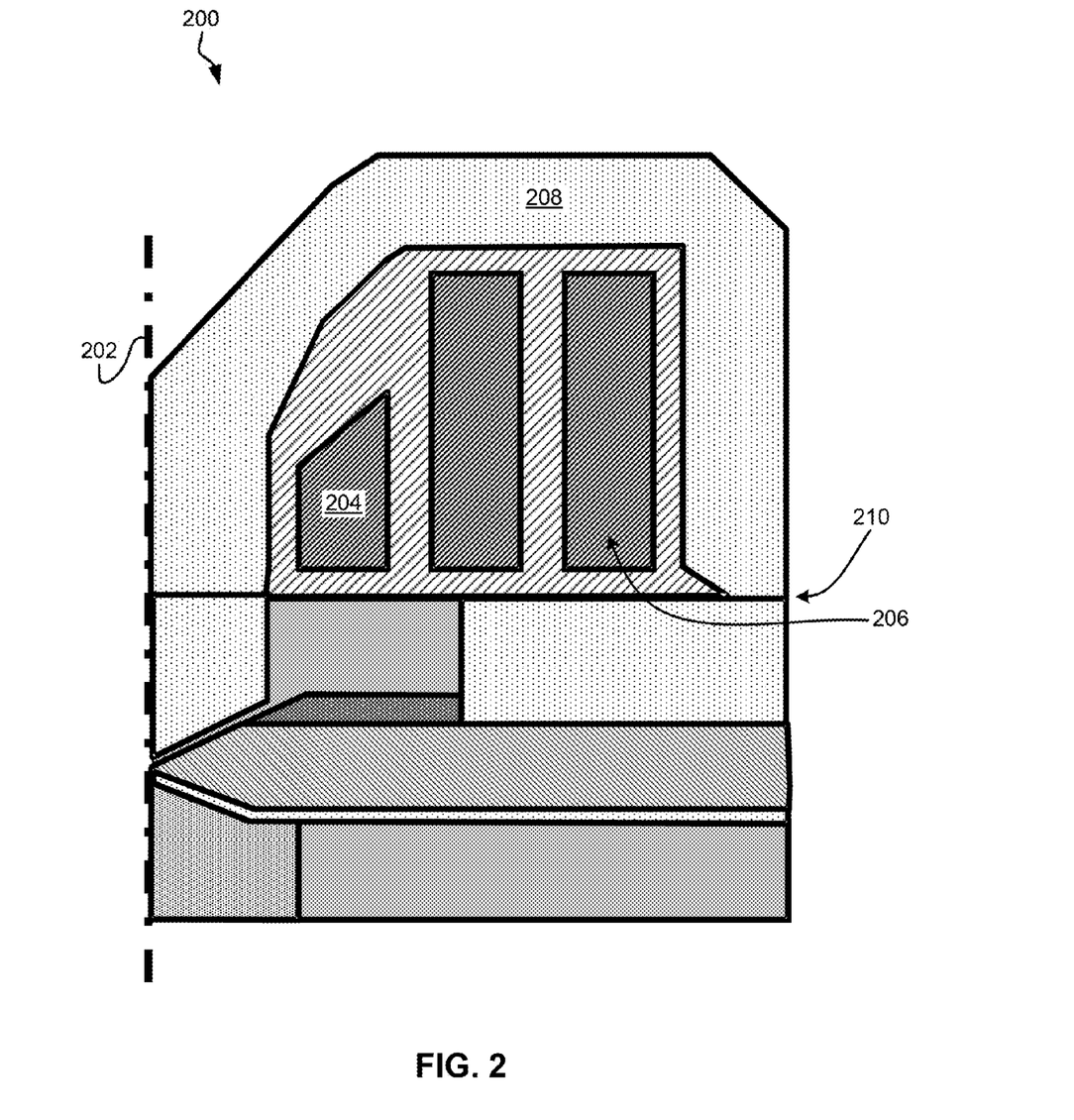
FIG. 2 shows a portion of a magnetic head according to one embodiment.

With reference to FIG. 2, a portion of a magnetic head 200 is shown according to one embodiment. As shown, a thickness is reduced for at least one coil, such as the coil 204 nearest to the media-facing surface 202 of the magnetic head 200. By making the coil 206 thin in at least one portion thereof, the structure and shape of the return pole or upper return pole (URP) 208 tracks this coil 206, so a gradually sloping URP 208 structure is obtained. As a result of this structure, the magnetic circuit is shortened, which is one objective of this magnetic head 200 structure, without introducing the other problems associated with a short yoke magnetic head.

Figure 3:
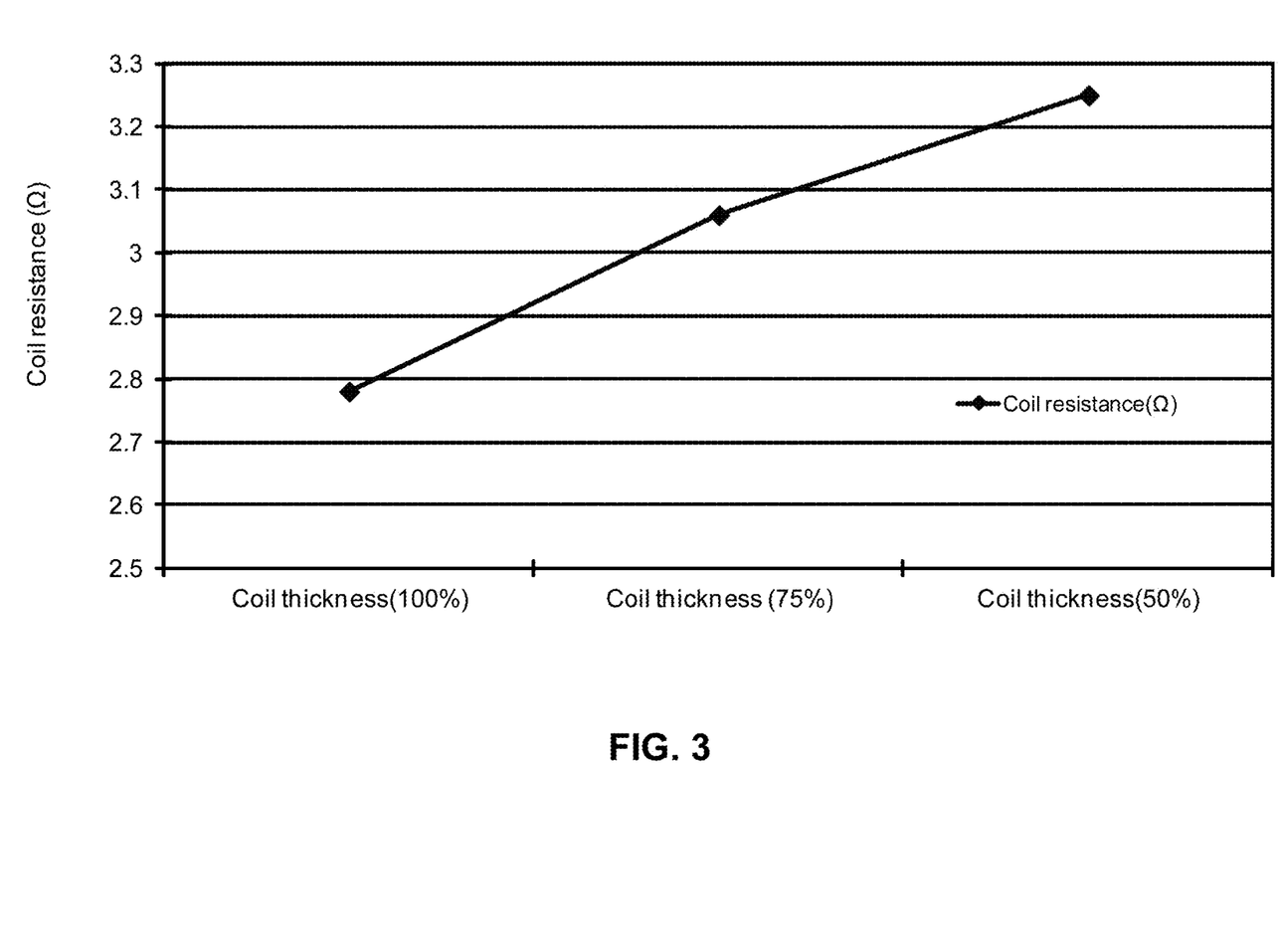
FIG. 3 shows coil resistance values for a magnetic head where coil film thickness of a first turn of the coil is reduced, according to one embodiment.

FIG. 3 shows coil resistance values for a magnetic head where coil film thickness of a first turn of the coil is reduced, according to one embodiment. When a film thickness of the first turn of the coil is reduced by half (50%), the coil resistance increases by about 15% from about 2.78Ω to about 3.24Ω. Further increase in the coil resistance above this level is undesirable due to unsatisfactory increase in heat generation, so it is desirable that the modified coil film thickness at the first coil be 50% or more of the coil film thickness elsewhere.

Figure 4:
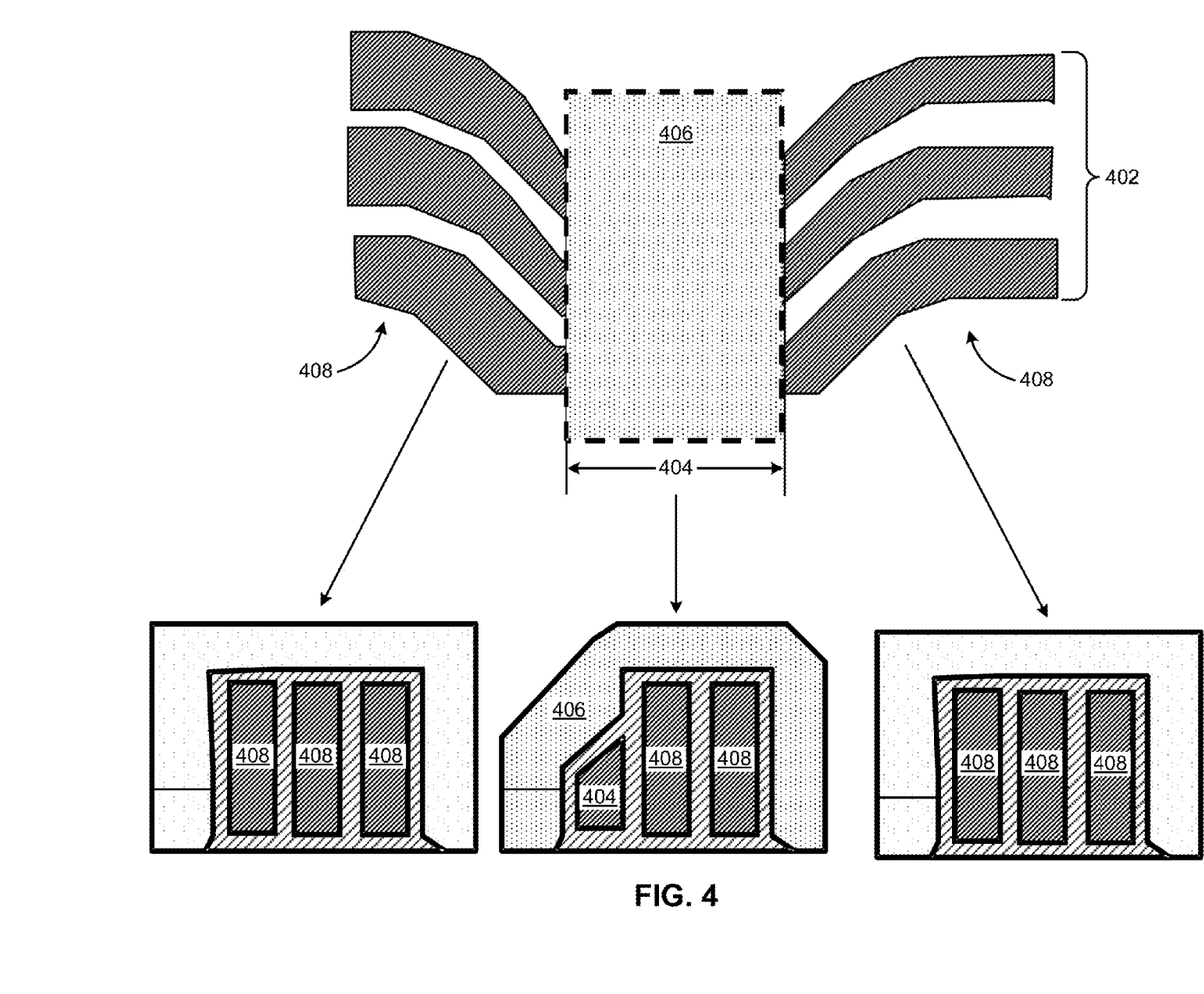
FIG. 4 shows a portion of a coil of a magnetic recording head according to one embodiment.

Furthermore, with reference to FIG. 4, the portion 404 of the coil 402 with reduced film thickness may be the portion 404 of the coil 402 directly below the URP 406 at a media-facing surface of the magnetic head, as shown in FIG. 4, according to one embodiment. Apart from this portion 404 of the coil 402, a film thickness for other portions 408 of the coil 402 may be unchanged from a conventional structure (thicker) and about constant, according to a further embodiment. Also, when manufacturing the thin film for the coil 402, a top end surface of the coil 402 may be tapered so that the film thickness of the portion 404 of the coil 402 on the media-facing-surface side thereof is reduced, and not the coil-facing side.

By having the film thickness of the coil near the media-facing surface thinner, the URP near the floating surface becomes curved instead of vertically-oriented, and the magnetic circuit length is shortened compared with a rectangular shape conventionally used in magnetic heads. In addition, as shown in the figures, the thickness of the URP in an element height direction perpendicular to the media-facing surface is sufficiently maintained, so the risk of FTI is reduced. By providing a taper on the coil, the curvature of the URP at the media-facing surface is further increased. Also, by not reducing the film thickness of the coil over the entire length of the coil, but instead reducing the thickness only at a portion directly below the URP parallel to the substrate surface, or by restricting relevant wiring to the first turn of the coil, it is possible to minimize the corresponding increase in resistance of the coil due to thinner of the film thickness thereof.

Figure 5:
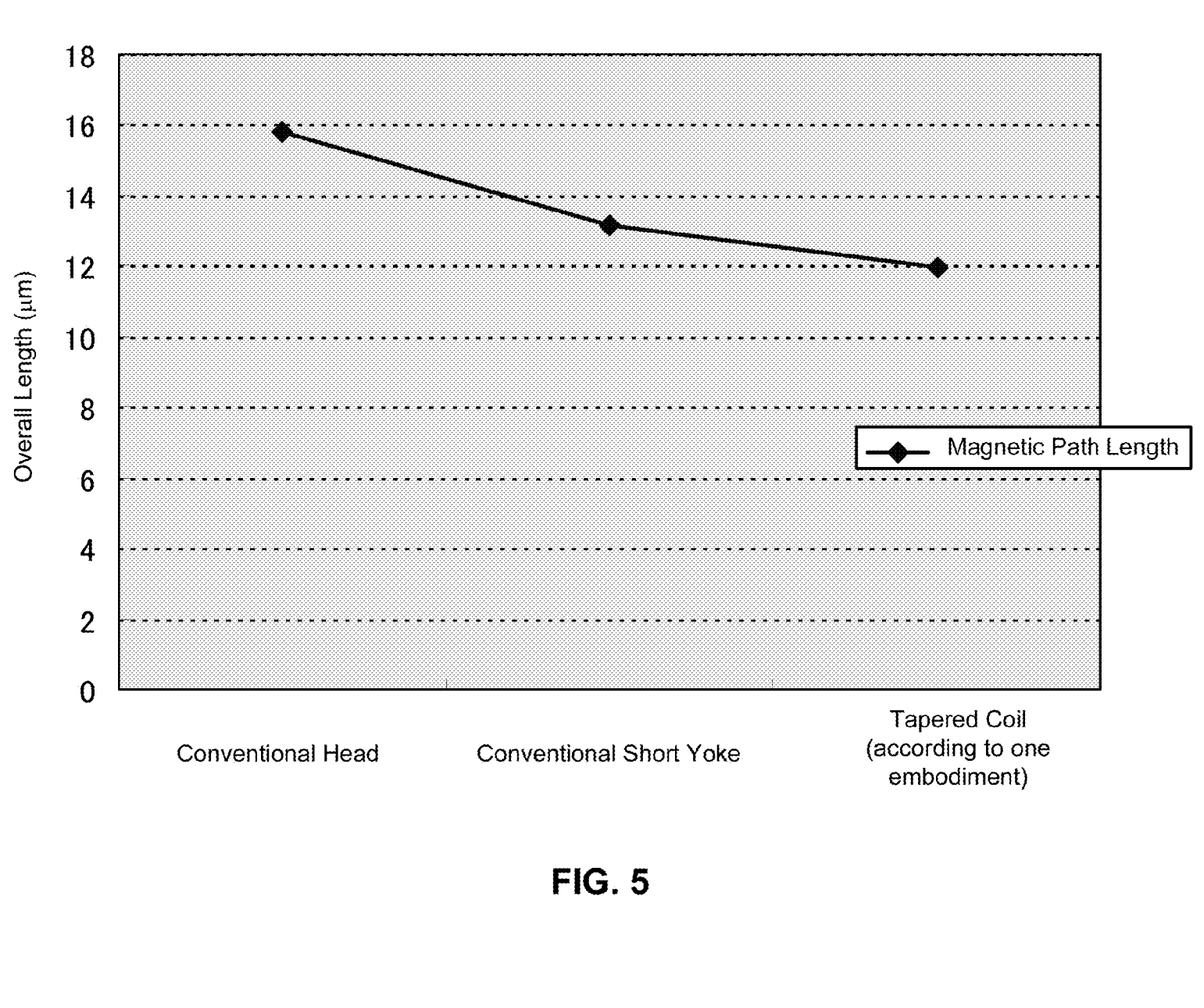
FIG. 5 shows a magnetic circuit length of various structures.

According to this embodiment, it is possible to shorten the length of the magnetic circuit and as a result, as shown in FIG. 5, it is possible to shorten the magnetic circuit length compared with a conventional structure and a conventional short yoke head.

Figure 6:
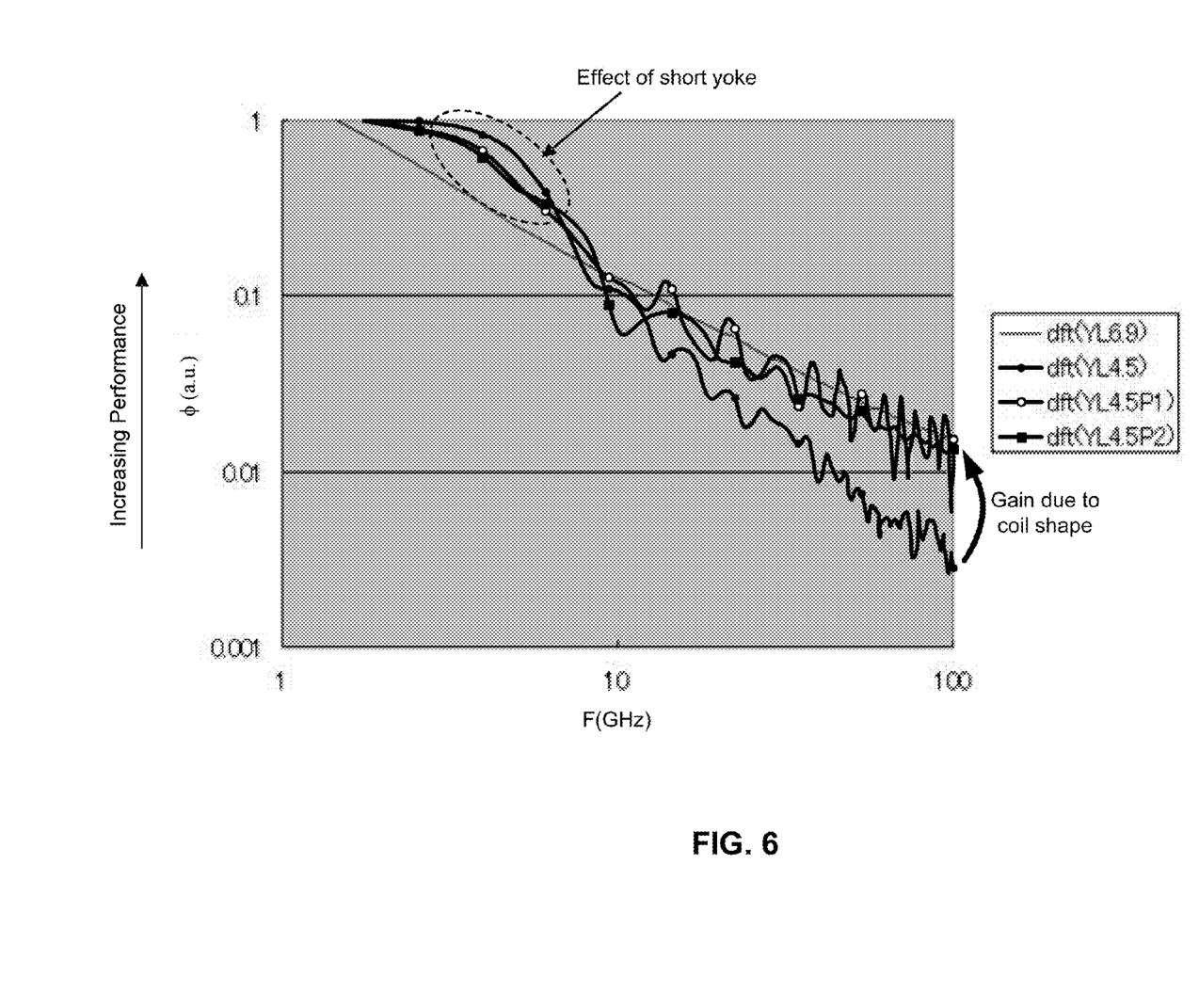
FIG. 6 shows effects of forming the upper return pole and coils as described herein according to various embodiments.
Figure 10:
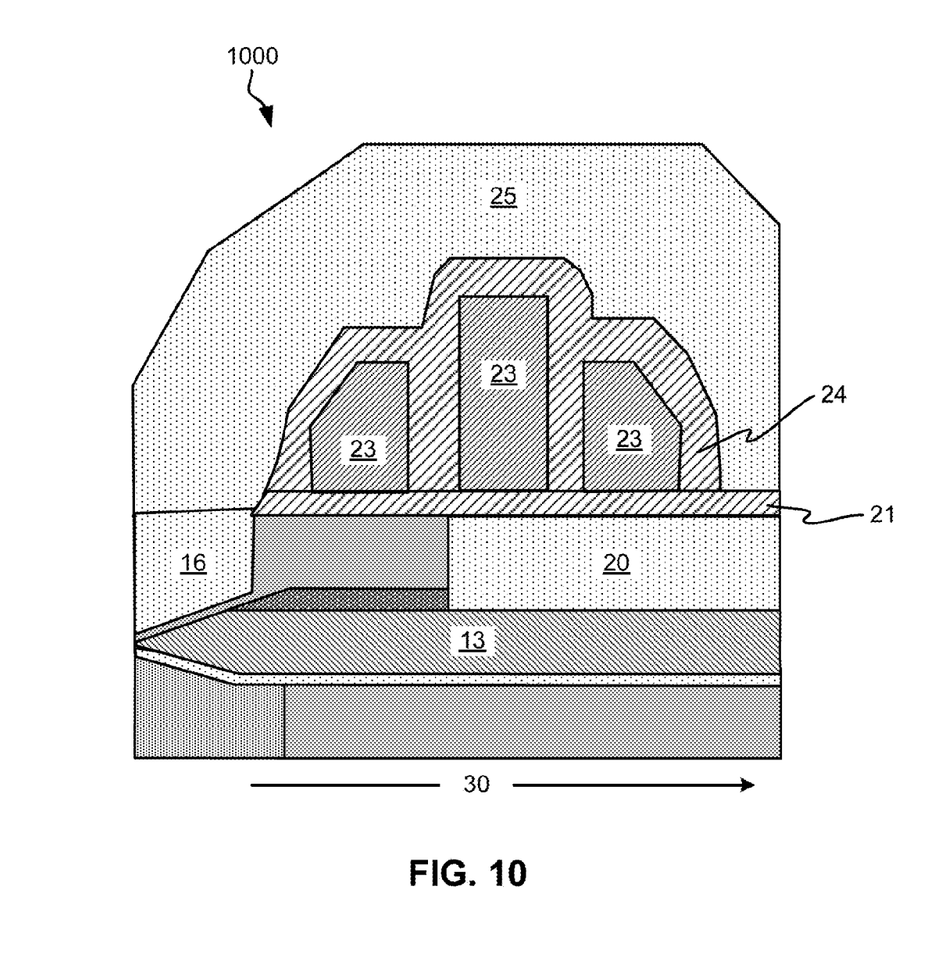
FIG. 10 shows a magnetic head according to one embodiment.

Also, as shown in FIG. 6, effects of forming the URP and coils as described herein according to various embodiments are shown by calculating the magnetic flux pass characteristic (frequency dependent) within the core. Calculations were carried out for a magnetic circuit length of 6.9 μm, dft (YL6.9), and three other magnetic circuit lengths of 4.5 μm, dft(YL4.5), dft(YL4.5P1), and dft(YL4.5P2). As shown, dft (YL4.5) is a short yoke structure (with no notch or thinning of the coil) with a magnetic circuit length of 4.5 μm, while dft(YL4.5P1) and dft(YL4.5P2) are structures according to two embodiments. In particular, dft(YL4.5P1) is a structure that has a notch at the end of the coil on the media-facing surface side (first embodiment), and dft(YL4.5P2) is a structure having a notch on the end of the coil near the back gap side of the rear end of the coil (as shown in FIG. 10 according to one embodiment).

As shown, in each of the heads, the higher the frequency, the lower the quantity of magnetic flux that is passed therethrough. However, comparing the results for less than 10 GHz for the magnetic circuit length of 6.9 μm and the results for the magnetic circuit length of 4.5 μm, it is clear that the rate of reduction for a magnetic circuit length of 4.5 μm is small, and the magnetic flux pass rate is high. However, at 10 GHz and higher, in the structure with just a magnetic circuit length of 4.5 μm, the rate of reduction is significant.

On the other hand, in dft(YL4.5P1) and dft(YL4.5P2), which are provided with a notch on the rear of the coil, the rate of degradation at 10 GHz or higher is small, and it can be seen that the rate of reduction is the same as the magnetic circuit length of 6.9 μm.

This result indicates that the degradation of the magnetic flux under high frequency conditions is small, so that the rise in the head magnetic field is steep.

As stated above, by providing a notch in the rear of the coil as in dft(YL4.5P1) and dft(YL4.5P2), the magnetic flux high frequency properties are improved. The reason for this is believed to be because when there is a sharp curve in the core through which magnetic flux flows, the components of the electromagnetic field at that position are easily leaked (more easily leaked the higher the frequency). As a counteraction to the leaked electromagnetic field components, passing of magnetic flux within the core is also hindered, and as a result it is considered that the pass characteristic degrades. By providing the notch in the coil, the core is allowed to curve gently. From this gentle curving it is believed that the magnetic flux pass characteristic is improved.

Figure 7:
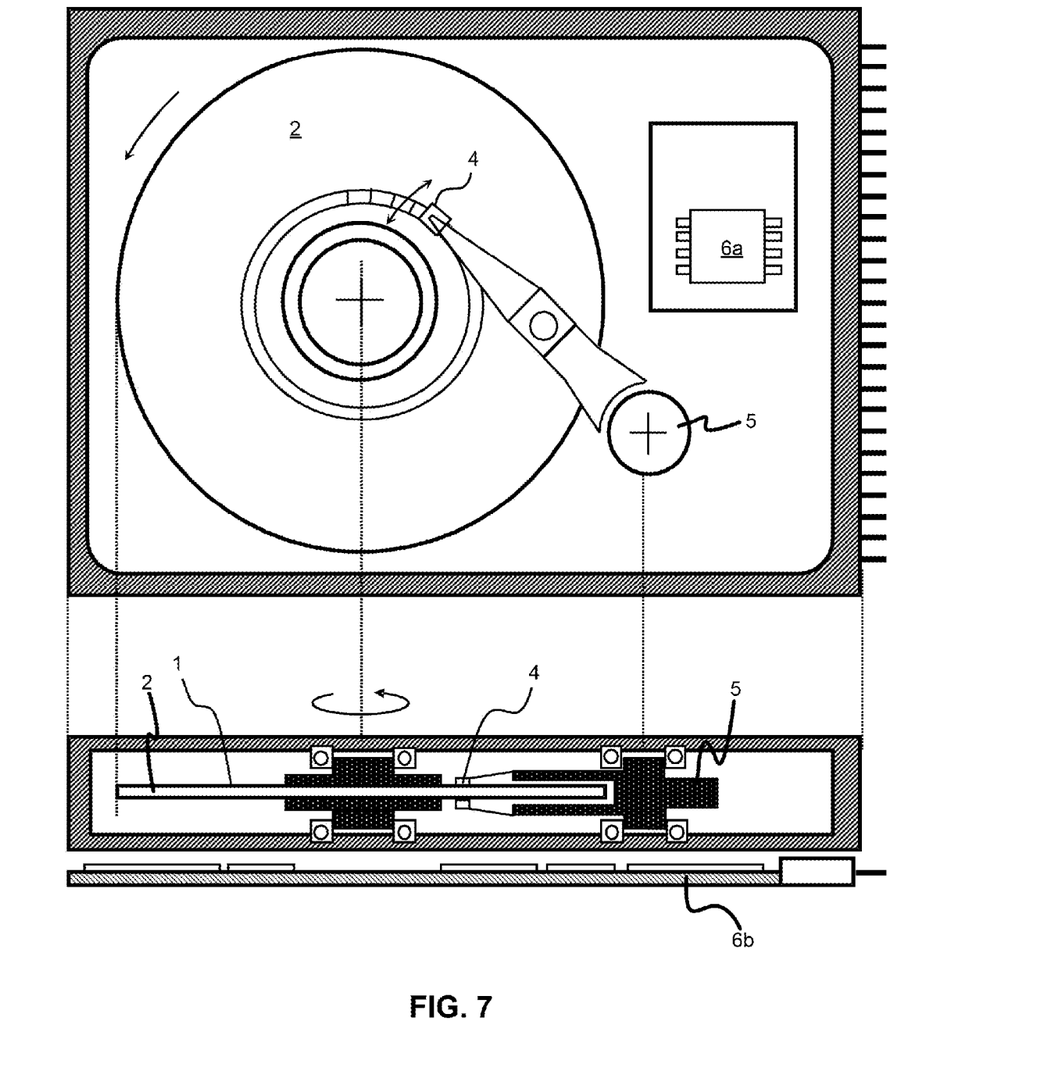
FIG. 7 shows an image of a magnetic recording device according to one embodiment.

FIG. 7 shows a schematic plan view and a schematic cross-sectional view of a magnetic reading and writing device, according to one embodiment. The magnetic reading and writing device records and reads magnetic signals with a magnetic head mounted on a slider 4 that is fixed to the tip of a suspension arm 3 at a predetermined position on a magnetic disk (magnetic recording medium) 2 that is rotated by a motor 1. By driving a rotary actuator 5, the position of the magnetic head in the radial direction of the magnetic disk (track) may be selected. Data to be written (recording signals) sent to the magnetic head and data read from the magnetic recording medium (read signals) from the magnetic head are processed by a controller, which may include signal processing circuits 6a, 6b.

In some embodiments, with reference to FIGS. 2 and 7, a magnetic data storage system may comprise at least one magnetic head, a magnetic medium, a drive mechanism for passing the magnetic medium over the at least one magnetic head, and a controller electrically coupled to the at least one magnetic head for controlling operation of the at least one magnetic head.

Figure 8:
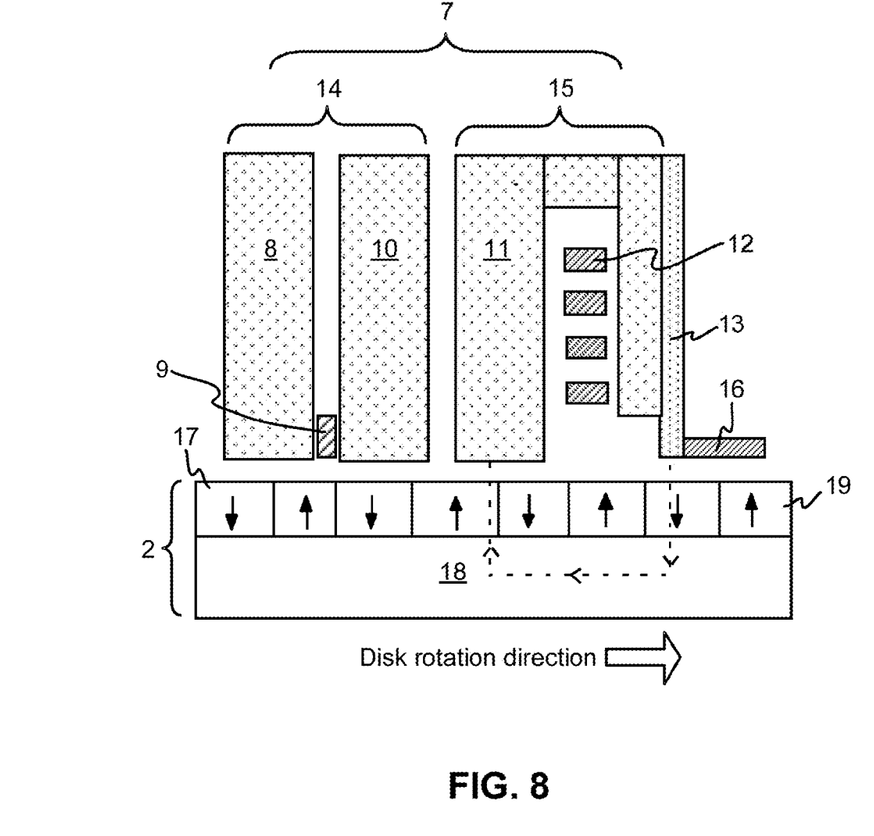
FIG. 8 is a schematic view showing the relationship between a magnetic head and a magnetic disk according to one embodiment.

FIG. 8 is a schematic view showing the relationship between the (perpendicular) magnetic head 7 and the magnetic disk 2 and perpendicular magnetic recording. The magnetic head 7 according to one embodiment includes a lower reproduction shield 8, a reproduction element 9, an upper reproduction shield 10, an auxiliary pole 11, a thin film coil 12, and a main pole 13 laminated in that order from the head traveling direction side (reading side). The lower reproduction shield 8, the reproduction element 9, and the upper reproduction shield 10 comprise a reproduction head 14, and the auxiliary pole 11, the thin film coil 12, and the main pole 13 comprise a recording head (single pole head) 15. The main pole 13 includes a track portion that is determined by the recording track width, and a flare portion that is formed integrally with the track portion and whose width gradually widens towards the element height direction. A trailing shield 16 is formed on the trailing side of the main pole 13 and on both sides in the track width direction. The shape of the floating surface of the track portion of the main pole 13 is an inverted trapezoidal shape with a narrow width on the leading side, taking into consideration the skew angle of the head. The magnetic field from the main pole 13 of the recording head 15 forms a magnetic circuit by passing through a magnetic recording layer 17 and a soft magnetic backing layer 18 of the magnetic disk 2, and entering the auxiliary pole 11, so a magnetization pattern 19 is recorded in the magnetic recording layer 17. In some approaches, an intermediate layer may be formed between the magnetic recording layer 17 and the soft magnetic backing layer 18 of the magnetic disk 2. A giant magnetoresistive effect element (GMR) or a tunnel magnetoresistive effect element (TMR) may be used in the reproduction element 9 of the reproduction head 14.

Figure 9A:
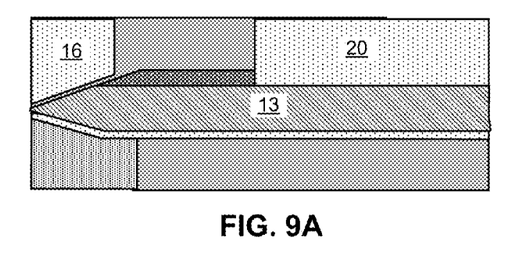
FIGS. 9A-9H show a process flow for forming a magnetic head according to one embodiment.

FIGS. 9A-9H show a process flow for manufacturing a magnetic head according to one embodiment. The magnetic head according to one embodiment may be formed using a Damascene method of forming trenches via dry etching and forming a main pole 13 via plating. The main pole 13 is configured to write data to a magnetic medium using a magnetic field. In FIG. 9A the trailing shield 16 and a subsidiary or auxiliary pole 20 are formed above or directly on a main pole 13, and planarized via chemical-mechanical planarization (CMP) or some other suitable method known in the art. The trailing shield 16 is positioned above the main pole 13 at a media-facing surface of the magnetic head.

Figure 9B:
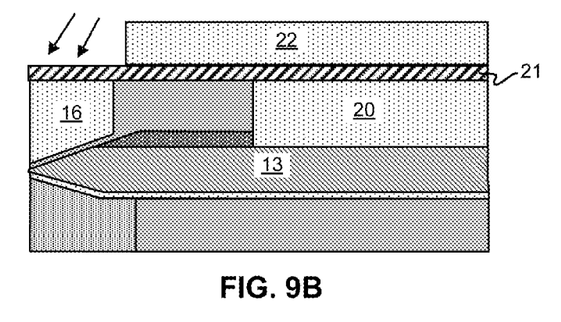

In FIG. 9B an insulating layer 21 is formed for providing insulation between the coil and the shield. Then, the insulating film 21 is removed from the trailing shield using milling with a resist 22 except for the portion on the top surface of the trailing shield. Any other removable process may be used as known in the art.

Figure 9C:
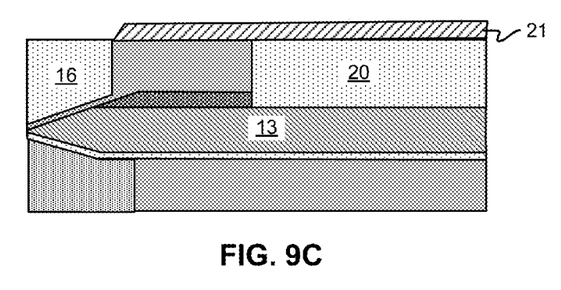
Figure 9D:
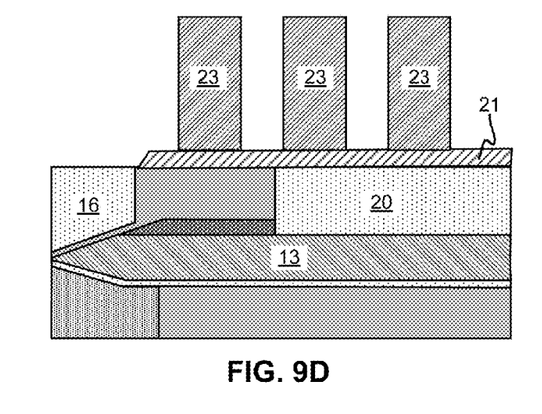

FIG. 9C shows the structure after alumina 21 is removed from the trailing shield 16. Any removable process may be used to remove the alumina as known in the art. FIG. 9D shows the coil 23 formed via any process known in the art to form a coil.

The coil 23 comprises a plurality of turns above the main pole 13, and is configured to produce magnetic flux in the main pole 13.

Figure 9E:
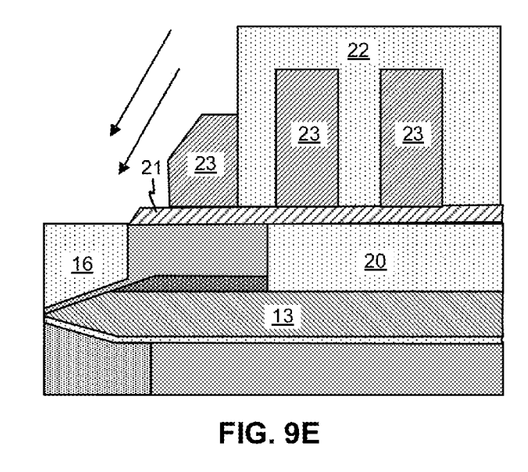

FIG. 9E shows a process for removing a portion of a first turn of the coil 23 on a media-facing surface side thereof so that a film thickness of the first turn of the coil 23 on the media-facing surface side thereof is less than a film thickness of a second turn of the coil 23. This may be accomplished by tapering the coil 23, according to one embodiment. In this embodiment, resist 22 is formed to cover the coil 23 from the second coil turn back (leaving the first coil turn exposed) and milling is carried out, to taper the first coil turn. The taper angle may altered by changing the milling angle to be any desired taper angle relative to an element height direction, such as about 5°, 10°, 15°, 30°, 45°, etc.

Figure 9F:
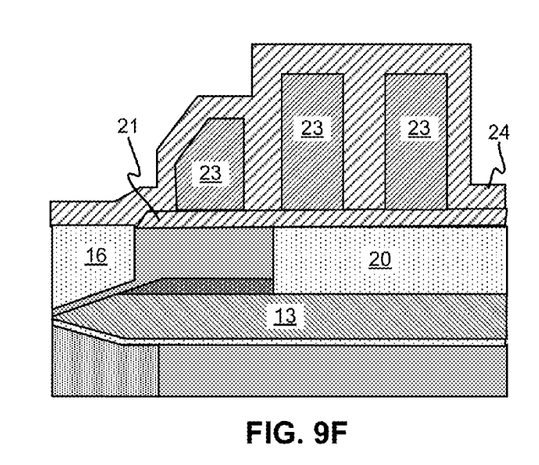

FIG. 9F shows the insulation layer 24 formed between the turns of the coil 23. Alumina may be used in the insulation layer via atomic layer deposition (ALD) or some other suitable formation technique known in the art. By using this method, it is possible to completely fill the voids between the coils with the alumina even with a coil pitch of about 1 µm or less.

Figure 9G:
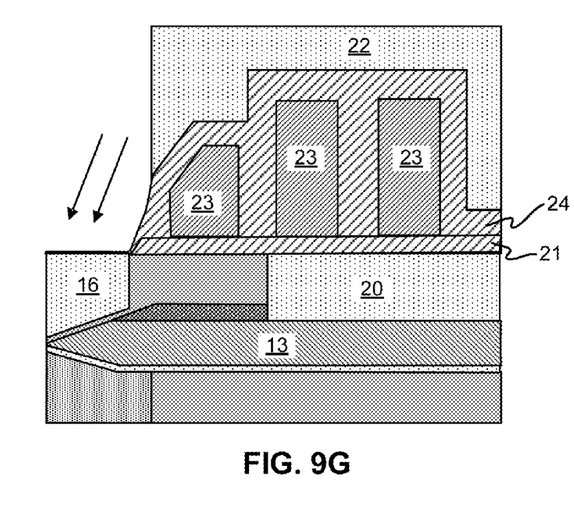

FIG. 9G shows the alumina that forms the resist 22 above the trailing shield 16 removed. The alumina may be removed via reactive ion etching (RIE) using BCL3 gas or some other suitable method known in the art, for example, milling may used in place of or in addition to RIE.

Figure 9H:
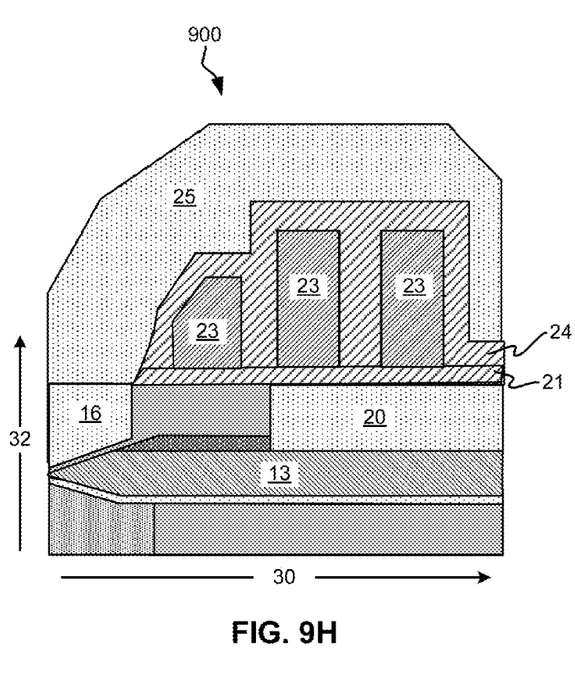

FIG. 9H shows a magnetic head 900 after return pole 25 formation, according to one embodiment. The return pole 25 is formed above the main pole 13 at a media-facing surface of the magnetic head 900, and is configured to return magnetic flux from the main pole 13 after it has exited a magnetic medium. The return pole 25 may include the resist 22 previously formed or it may be formed in place of the resist 22.

In one embodiment, the return pole 25 may be formed such that a depth of the return pole in an element height direction on a media-facing surface side thereof increases along the down-track direction from the trailing shield 16.

As shown in FIG. 9H, the magnetic head 900 comprises a main pole 13 configured to write data to a magnetic medium using a magnetic field, a return pole 25 positioned above the main pole 13 at a media-facing surface of the magnetic head 900, the return pole 25 being configured to return magnetic flux from the main pole 13 after it has exited a magnetic medium, and a coil 23 configured to produce magnetic flux in the main pole 13, the coil 23 being positioned below the return pole 25. A film thickness of a first turn of the coil 23 on a media-facing surface side thereof is less than a film thickness of a second turn of the coil 23.

In some embodiments, the magnetic head 900 may further include a trailing shield 16 positioned on a trailing side of the main pole 13 in a down-track direction 32 at the media-facing surface of the magnetic head 900. Furthermore, a depth of the return pole 25 in an element height direction 30 on a media-facing surface side thereof increases along the down-track direction 32 from the trailing shield 16.

In another embodiment, the first turn of the coil 23 may have a tapered profile such that the film thickness of the media-facing surface side of the first turn of the coil 23 is less than a film thickness of a side opposite the media-facing surface side of the first turn of the coil 23. In some further embodiments, the film thickness of the side opposite the media-facing surface side of the first turn of the coil 23 may be less than a film thickness of the coil 23 at any other position (as shown).

In some approaches, the first turn of the coil 23 may have a uniform thickness outside of a range where the film thickness is reduced at the media-facing surface side of the first turn of the coil 23, the range being limited to a width of the return pole 25 in a direction (into the page) parallel to the media-facing surface of the magnetic head 900.

In another embodiment, the film thickness of the media-facing surface side of the first turn of the coil 23 may be less than a film thickness of the coil 23 at any other position.

FIG. 10 shows a magnetic head 1000 according to another embodiment. In this embodiment, the third coil turn (or whichever is the furthest coil turn from the media-facing surface of the magnetic head 1000 in the element height direction 30, in one approach) may be tapered in a similar manner as the first coil turn. The magnetic circuit length may be further shortened in a magnetic head 1000 according to this embodiment.

In this embodiment, a film thickness of the coil 23 at a position furthest from the media-facing surface of the magnetic head 1000 may be less than a film thickness of the second turn of the coil 23. In a further embodiment, the media-facing surface side of the coil 23 at the position furthest from the media-facing surface of the magnetic head 1000 may have a tapered profile such that the film thickness of the media-facing surface side of the coil 23 at the position furthest from the media-facing surface of the magnetic head 1000 is less than a film thickness of a side opposite the media-facing surface side of the coil 23 at the position furthest from the media-facing surface of the magnetic head 1000.

Figure 11:
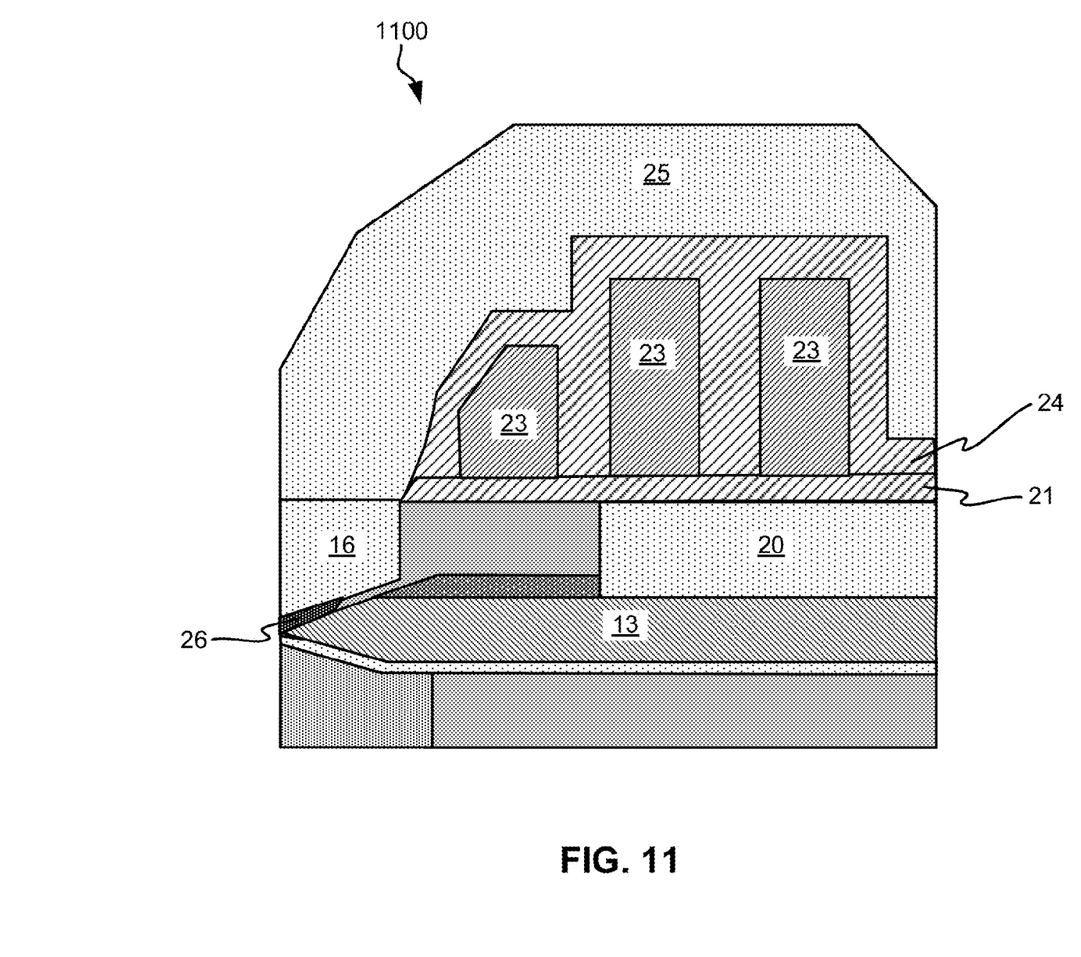
FIG. 11 shows a magnetic head according to another embodiment.

FIG. 11 shows a magnetic head 1100 according to another embodiment. This magnetic head 1100 is a microwave-assisted magnetic recording (MAMR) head having a spin torque oscillator (STO) 26 therein.

Of course, many other types of magnetic heads may be formed using the techniques and structures described herein according to various embodiments.

One of the benefits of using the magnetic heads described herein is that the area of the URP below which is adjacent the media-facing surface of the magnetic head is reduced compared to conventional structures, and therefore the risk of FTI is reduced when compared to conventional heads, including short yoke structures.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a main pole configured to write data to a magnetic medium using a magnetic field;
   a trailing shield positioned on a trailing side of the main pole in a down-track direction along a media-facing surface of the magnetic head;
   a return pole positioned above the main pole at the media-facing surface of the magnetic head, the return pole being configured to return magnetic flux from the main pole after it has exited a magnetic medium; and
   a coil configured to produce magnetic flux in the main pole, the coil being positioned below the return pole,
   wherein a film thickness of a first turn of the coil on a media-facing surface side thereof is less than a film thickness of a second turn of the coil.

2. The magnetic head as recited in claim 1, wherein the trailing shield is further positioned on both sides of the main pole in a track width direction.

3. The magnetic head as recited in claim, wherein a depth of the return pole in an element height direction on a media-facing surface side thereof increases along the down-track direction from the trailing shield.

4. The magnetic head as recited in claim 1, wherein the first turn of the coil has a tapered profile such that the film thickness of the media-facing surface side of the first turn of the coil is less than a film thickness of a side opposite the media-facing surface side of the first turn of the coil.

5. The magnetic head as recited in claim 4, wherein the film thickness of the side opposite the media-facing surface side of the first turn of the coil is less than a film thickness of the coil at any other position.

6. The magnetic head as recited in claim 1, wherein the first turn of the coil has a uniform thickness outside of a range where the film thickness is reduced at the media-facing surface side of the first turn of the coil, the range being limited to a width of the return pole in a direction parallel to the media-facing surface of the magnetic head.

7. The magnetic head as recited in claim 1, wherein the film thickness of the media-facing surface side of the first turn of the coil is less than a film thickness of the coil at any other position.

8. The magnetic head as recited in claim 1, wherein a film thickness of the coil at a position furthest from the media-facing surface of the magnetic head is less than a film thickness of the second turn of the coil.

9. The magnetic head as recited in claim 8, wherein the media-facing surface side of the coil at the position furthest from the media-facing surface of the magnetic head has a tapered profile such that the film thickness of the media-facing surface side of the coil at the position furthest from the media-facing surface of the magnetic head is less than a film thickness of a side opposite the media-facing surface side of the coil at the position furthest from the media-facing surface of the magnetic head.

10. A magnetic data storage system, comprising:
at least one magnetic head as recited in claim 1;
the magnetic medium;
a drive mechanism for passing the magnetic medium over the at least one magnetic head; and
a controller electrically coupled to the at least one magnetic head for controlling operation of the at least one magnetic head.

11. A method for forming a magnetic head, the method comprising:
forming a main pole configured to write data to a magnetic medium using a magnetic field;
forming a coil comprising a plurality of turns above the main pole, the coil being configured to produce magnetic flux in the main pole;
forming a trailing shield on a trailing side of the main pole in a down-track direction;
removing a portion of a first turn of the coil on a media-facing surface side thereof so that a film thickness of the first turn of the coil on the media-facing surface side thereof is less than a film thickness of a second turn of the coil; and
forming a return pole above the main pole at the media-facing surface of the magnetic head, the return pole being configured to return magnetic flux from the main pole after it has exited a magnetic medium,
wherein the trailing shield is positioned between the main pole and the return pole along a media-facing surface of the magnetic head.

12. The method as recited in claim 11, wherein the trailing shield is further positioned on both sides of the main pole in a track width direction.

13. The method as recited in claim 11, wherein the return pole is formed such that a depth of the return pole in an element height direction on a media-facing surface side thereof increases along the down-track direction from the trailing shield.

14. The method as recited in claim 11, wherein the first turn of the coil is formed to have a tapered profile such that the film thickness of the media-facing surface side of the first turn of the coil is less than a film thickness of a side opposite the media-facing surface side of the first turn of the coil.

15. The method as recited in claim 14, wherein the first turn of the coil is formed such that the film thickness of the side opposite the media-facing surface side of the first turn of the coil is less than a film thickness of the coil at any other position.

16. The method as recited in claim 11, wherein the first turn of the coil is formed to have a uniform thickness outside of a range where the film thickness is reduced at the media-facing surface side of the first turn of the coil, the range being limited to a width of the return pole in a direction parallel to the media-facing surface of the magnetic head.

17. The method as recited in claim 11, wherein the first turn of the coil is formed such that the film thickness of the media-facing surface side of the first turn of the coil is less than a film thickness of the coil at any other position.

18. The method as recited in claim 11, wherein the coil is formed such that a film thickness of the coil at a position furthest from the media-facing surface of the magnetic head is less than a film thickness of the second turn of the coil.

19. The method as recited in claim 18, wherein the coil is formed such that the media-facing surface side of the coil at the position furthest from the media-facing surface of the magnetic head has a tapered profile such that the film thickness of the media-facing surface side of the coil at the position furthest from the media-facing surface of the magnetic head is less than a film thickness of a side opposite the media-facing surface side of the coil at the position furthest from the media-facing surface of the magnetic head.

* * * * *